(12) United States Patent
Gurusamy et al.

(10) Patent No.: US 12,302,136 B2
(45) Date of Patent: May 13, 2025

(54) SYSTEM AND METHOD TO DISPLAY CONNECTIVITY STRENGTH AND COMMUNICATION PERFORMANCE OF CONNECTED VEHICLES

(71) Applicant: Honeywell International Inc., Charlotte, NC (US)

(72) Inventors: Saravanakumar Gurusamy, Tamil Nadu (IN); Jayasenthilnathan Balasubramanian, Morris Plains, NJ (US); Madhava Gadicherla, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 520 days.

(21) Appl. No.: 17/376,647

(22) Filed: Jul. 15, 2021

(65) Prior Publication Data
US 2022/0369135 A1    Nov. 17, 2022

(30) Foreign Application Priority Data

May 17, 2021    (IN) .............................. 202111022051

(51) Int. Cl.
*G06F 17/00*    (2019.01)
*G01C 21/34*    (2006.01)
(Continued)

(52) U.S. Cl.
CPC ........ *H04W 24/08* (2013.01); *G01C 21/3415* (2013.01); *G01S 19/25* (2013.01);
(Continued)

(58) Field of Classification Search
CPC ....... H04W 24/08; H04W 4/029; H04W 4/44; H04W 24/10; H04W 4/40; H04W 40/248;
(Continued)

(56) References Cited

U.S. PATENT DOCUMENTS 7,522,923 B2 *    4/2009    Fricke .................... H04L 67/62
                                                          455/452.2
10,330,485 B2     6/2019    Kumar et al.
(Continued)

FOREIGN PATENT DOCUMENTS

CN      102821319 B      4/2015
DE    102004016379 A1   10/2005
(Continued)

OTHER PUBLICATIONS

Advanced Avionics Handbook (Year: 2009) (Year: 2009).*
(Continued)

*Primary Examiner* — Ronnie M Mancho
(74) *Attorney, Agent, or Firm* — Alston & Bird LLP

(57) ABSTRACT

Systems and methods for displaying connectivity strength for vehicles are disclosed. For instance, the method may include receiving, from an off-board station, connectivity data relating to a connected vehicle, the connectivity data having been received from a plurality of connected vehicles other than the connected vehicle and selected based on relevance to the connected vehicle; identifying a portion of the received connectivity data to display on the connected vehicle; generating a display of the identified portion of the received connectivity data; and displaying on a display unit of the connected vehicle, the generated display of the identified portion of the received connectivity data. The method may also include generating and displaying an updated route based on the received connectivity data.

20 Claims, 11 Drawing Sheets

(51) Int. Cl.
*G01S 19/25* (2010.01)
*G06F 3/14* (2006.01)
*G08G 1/137* (2006.01)
*H04W 4/029* (2018.01)
*H04W 4/44* (2018.01)
*H04W 24/08* (2009.01)
*H04W 24/10* (2009.01)

(52) U.S. Cl.
CPC .............. *G06F 3/14* (2013.01); *G08G 1/137* (2013.01); *H04W 4/029* (2018.02); *H04W 4/44* (2018.02); *H04W 24/10* (2013.01)

(58) Field of Classification Search
CPC ..... G01C 21/3415; G01S 19/25; G01S 19/05; G06F 3/14; G08G 1/137; G08G 5/0013; G08G 5/0026; G08G 5/0039; G08G 5/0069; G08G 5/0078; G08G 5/0082; G08G 5/0086; G09G 2380/12
USPC .......................................................... 701/412
See application file for complete search history.

(56) References Cited

U.S. PATENT DOCUMENTS

| | | | |
|---|---|---|---|
| 10,609,515 B1* | 3/2020 | Bender | H04W 4/024 |
| 10,630,803 B2* | 4/2020 | Hwang | H04L 67/5681 |
| 10,746,558 B2* | 8/2020 | Muldoon | G01C 21/3453 |
| 10,932,180 B2* | 2/2021 | Hassan | H04W 4/029 |
| 2013/0238807 A1* | 9/2013 | Wakikawa | H04W 48/18 709/227 |
| 2015/0281906 A1* | 10/2015 | Tseng | H04L 67/61 455/456.3 |
| 2016/0280401 A1 | 9/2016 | Driscoll et al. | |
| 2016/0341830 A1 | 11/2016 | Dougan | |
| 2017/0215165 A1 | 7/2017 | Tseng et al. | |
| 2019/0041225 A1* | 2/2019 | Winkle | H04W 48/16 |
| 2020/0166348 A1 | 5/2020 | Dave et al. | |
| 2021/0044946 A1* | 2/2021 | Bhaskaran | H04W 76/14 |
| 2021/0061306 A1 | 3/2021 | Dagan et al. | |
| 2021/0089055 A1* | 3/2021 | Tran | B64U 10/30 |

FOREIGN PATENT DOCUMENTS

| | | |
|---|---|---|
| KR | 20040102722 A | 12/2004 |
| KR | 20050099759 A | 10/2005 |
| KR | 100536398 B1 | 12/2005 |
| WO | 2021029869 A1 | 2/2021 |

OTHER PUBLICATIONS

Advanced Avionics Handbook (Year: 2009).*
EP Office Action Mailed on Feb. 3, 2025 for EP Application No. 21211838, 9 page(s).

* cited by examiner

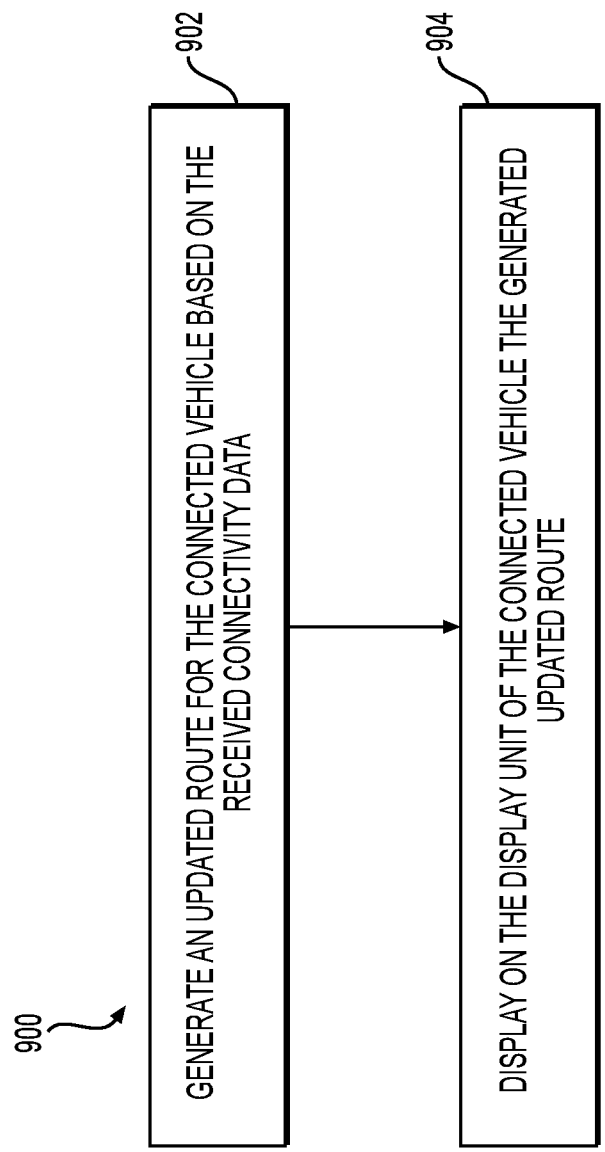

SYSTEM AND METHOD TO DISPLAY CONNECTIVITY STRENGTH AND COMMUNICATION PERFORMANCE OF CONNECTED VEHICLES

CROSS-REFERENCE TO RELATED APPLICATIONS

This application claims the benefit of priority under 35 U.S.C. § 119 from Indian Patent Application No. 202111022051, filed on May 17, 2021, the contents of which are incorporated by reference in their entirety.

TECHNICAL FIELD

Various embodiments of the present disclosure relate generally to the fields of communication and route planning for vehicles and, more particularly, to systems and methods for transmitting connectivity data and systems and methods for displaying connectivity strength for connected vehicles, such as unmanned aerial vehicles ("UAVs") and/or urban air mobility ("UAM") vehicles.

BACKGROUND

As ground vehicle traffic in urban cities continues to increasingly delay drivers and riders, leading industries are looking to alternative forms of transportation. Urban air mobility (UAM) is an aviation industry term for on-demand passenger or cargo-carrying air transportation services, typically flown without a pilot (e.g., automated). As the UAM industry expands, UAM vehicles will begin to populate airspaces occupied by high-rise buildings in cities and regularly fly over congested urban environments. The UAM vehicles will be equipped with connectivity solutions, such as mobile/cell connections, for communicating with air traffic control (ATC) and ground operations stations. One particular mobile network technology for UAM communications is 5G. Despite the reliance on 5G or other connectivity solutions, UAM vehicles, as well as other vehicles that are equipped with connectivity solutions (i.e. connected vehicles), face a significant challenge in urban environments due to dead zone areas where 5G and global positioning system (GPS) coverage may be low or even nonexistent.

Urban environments often have low connectivity due to the abundance of high-rise buildings or other obstructions covering the landscape, and/or due to the topology of the terrain. For instance, if the height of a building in an urban environment is taller than the connected vehicle's cruising altitude, then the connectivity may be impacted. As a result, a significant portion of the connected vehicle's flight path may have low connectivity. Instances of low connectivity and dead zones, make communication between connected vehicles and ATC or ground operations stations difficult, and at times communication is non-existent. Low connectivity areas also lead to poor coverage during the crucial landing phase of connected vehicle flights. Accordingly, avoiding low connectivity areas is critical for connected vehicles, such as UAM vehicles.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for transmitting connectivity data, generating connectivity data, and displaying connectivity data on vehicles.

In one aspect, a method of transmitting connectivity data to a connected vehicle is disclosed. The method may include: receiving connectivity data related to a plurality of connected vehicles; and transmitting a subset of the received connectivity data related to the plurality of connected vehicles to a connected vehicle other than the plurality of connected vehicles, the subset being selected based on relevance to the connected vehicle.

In another aspect, a method of receiving and displaying connectivity data on a connected vehicle is disclosed. The method may include: receiving, from an off-board station, connectivity data relating to the connected vehicle, the connectivity data having been received from a plurality of connected vehicles other than the connected vehicle and selected based on relevance to the connected vehicle; identifying a portion of the received connectivity data to display on the connected vehicle; generating a display of the identified portion of the received connectivity data; and displaying on a display unit of the connected vehicle, the generated display of the identified portion of the received connectivity data.

In yet another aspect, a method of generating connectivity data on a connected vehicle is disclosed. The method may include: transmitting a message from a connected vehicle to a ground station; receiving an automated reply, after the transmitted message is received, from the ground station; calculating a transaction time between transmitting the message and receiving the automated reply; and generating connectivity data from the calculated transaction time.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 9 depicts a flowchart illustrating another exemplary method of generating an updated route or flight plan based on the received connectivity data, according to one or more embodiments.

DETAILED DESCRIPTION

Figure 1:
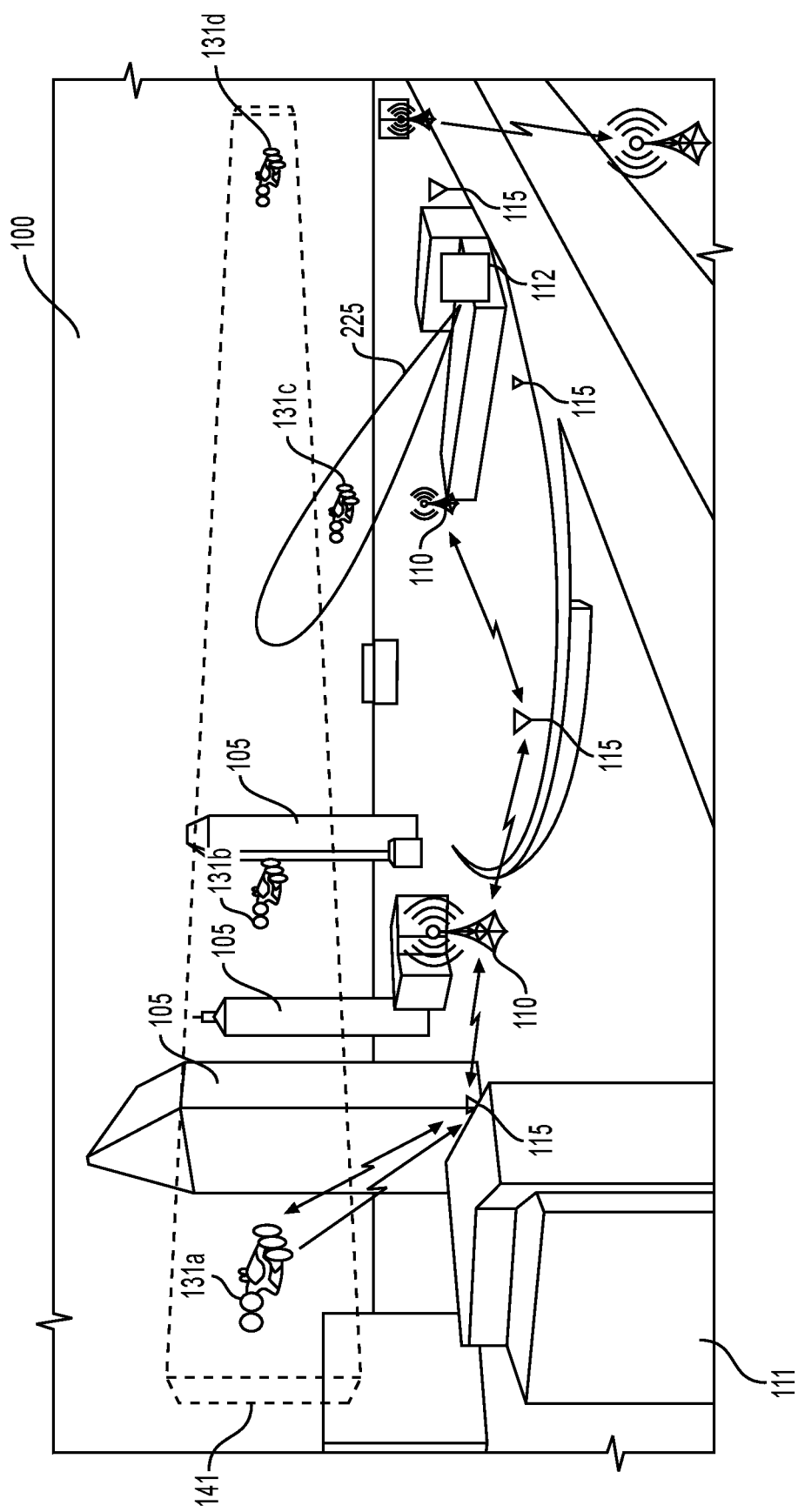
FIG. 1 depicts an exemplary spatial environment (e.g., an urban landscape) in which methods, systems, and other aspects of the present disclosure may be implemented.

Various embodiments of the present disclosure relate generally to the fields of communication and route planning for vehicles and, more particularly, to systems and methods for transmitting connectivity data and systems and methods for displaying connectivity strength for connected vehicles, such as urban air mobility (UAM) vehicles.

As discussed above in the BACKGROUND, there is a need for a connected vehicle to have access to connectivity data relevant to the vehicle in order to avoid low/no connectivity areas where the connected vehicle may encounter poor connectivity coverage and/or loss of communication.

A proposed technical solution for the aforementioned problem is to display connectivity data related to areas with low or no connectivity strength on a vehicle. By receiving and displaying connectivity data related to areas with low or no connectivity strength, the vehicle can avoid these areas along its route. In addition, an updated route can be generated based on the connectivity data. For example, a ground operations station receives connectivity data, which may include: connectivity data from connected vehicles, GPS signal strength parameters received from satellites in communication with connected vehicles, mobile cell connectivity or signal strength from a service provider providing communication to connected vehicles, building profile data, map data, and so forth. The ground operations station then transmits a subset of the received connectivity data relaying low or non-existent connectivity strength to a specific connected vehicle based on the location of the connected vehicle or the current time. The ground operations center may also generate an updated route for the specific connected vehicle based on the received connectivity data and transmit the updated route to the vehicle.

In another example, a connected vehicle receives connectivity data from a ground operations station based on the vehicle's location or the current time. The connected vehicle identifies a portion of the received connectivity data related to areas with low or non-existent connectivity strength to display on the connected vehicle. The connected vehicle then generates a display from the identified portion of the received connectivity data and displays the generated display showing areas with low or non-existent connectivity strength. The connected vehicle will also be able to generate an updated route onboard which circumvents areas with low connectivity strength.

For the reasons stated above and other reasons stated below which will become apparent to those skilled in the art upon reading and understanding the specification, there is a need in the art for systems and methods that display connectivity data on vehicles and, more particularly, connected vehicles in UAM environments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in an overly limiting sense.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% of a stated or understood value.

The term "exemplary" is used in the sense of "example" rather than "ideal." An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. As used herein, the singular forms "a," "an," and "the" include plural reference unless the context dictates otherwise. The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

While this disclosure describes the methods with reference to connected vehicles, it should be appreciated that the present methods are also applicable to other types of vehicle, including aircraft, drones, automobiles, ships, spacecraft, or any other manned, unmanned, autonomous and/or Internet-connected vehicle.

Referring now to the appended drawings FIG. 1 depicts an exemplary spatial environment in which systems, methods and other aspects of the present disclosure may be implemented. The environment of FIG. 1 may include an airspace 100 and one or more hubs 111-112. A hub, such as any one of 111-112, may be a ground facility where connected vehicles may take off, land, or remain parked (e.g., airport, vertiport, heliport, vertistop, helistop, temporary landing/takeoff facility, or the like). Airspace 100 may be positioned adjacent to and/or over one or more structures 105 (e.g., buildings as well as other types of man-made or natural structures). The airspace 100 may accommodate one or more connected vehicles 131 (e.g., connected vehicles 131a, 131b, 131c, and 131d) flying at various altitudes and via various routes 141. A connected vehicle may be any apparatus or vehicle of air transportation capable of traveling between two or more hubs 111-112, such as an aircraft, a vertical take-off and landing aircraft (VTOL), a drone, a helicopter, an unmanned aerial vehicle (UAV), an urban air mobility (UAM) vehicle, a hot-air balloon, a military aircraft, and the like. During travel, each of the connected vehicles 131 may be positioned within proximity to one or more other connected vehicles 131 and/or structures 105.

FIG. 1 also includes one or more communications station(s) 110 and/or one or more ground station(s) (ground operations center) 115. Between, near, and/or on hubs, such as hubs 111-112, the one or more ground station(s) (ground operations center) 115 may be distributed (e.g., evenly, based on traffic considerations, etc.) along/near/on/under routes 141. Between, near, and/or on hubs, such as hubs 111-112, the one or more communications station(s) 110 may be distributed (e.g., evenly, based on traffic considerations, etc.). Some (or all) of the one or more ground station(s) (ground operations center) 115 may be paired with a communication station 110 of the one or more communications station(s) 110.

Figure 2:
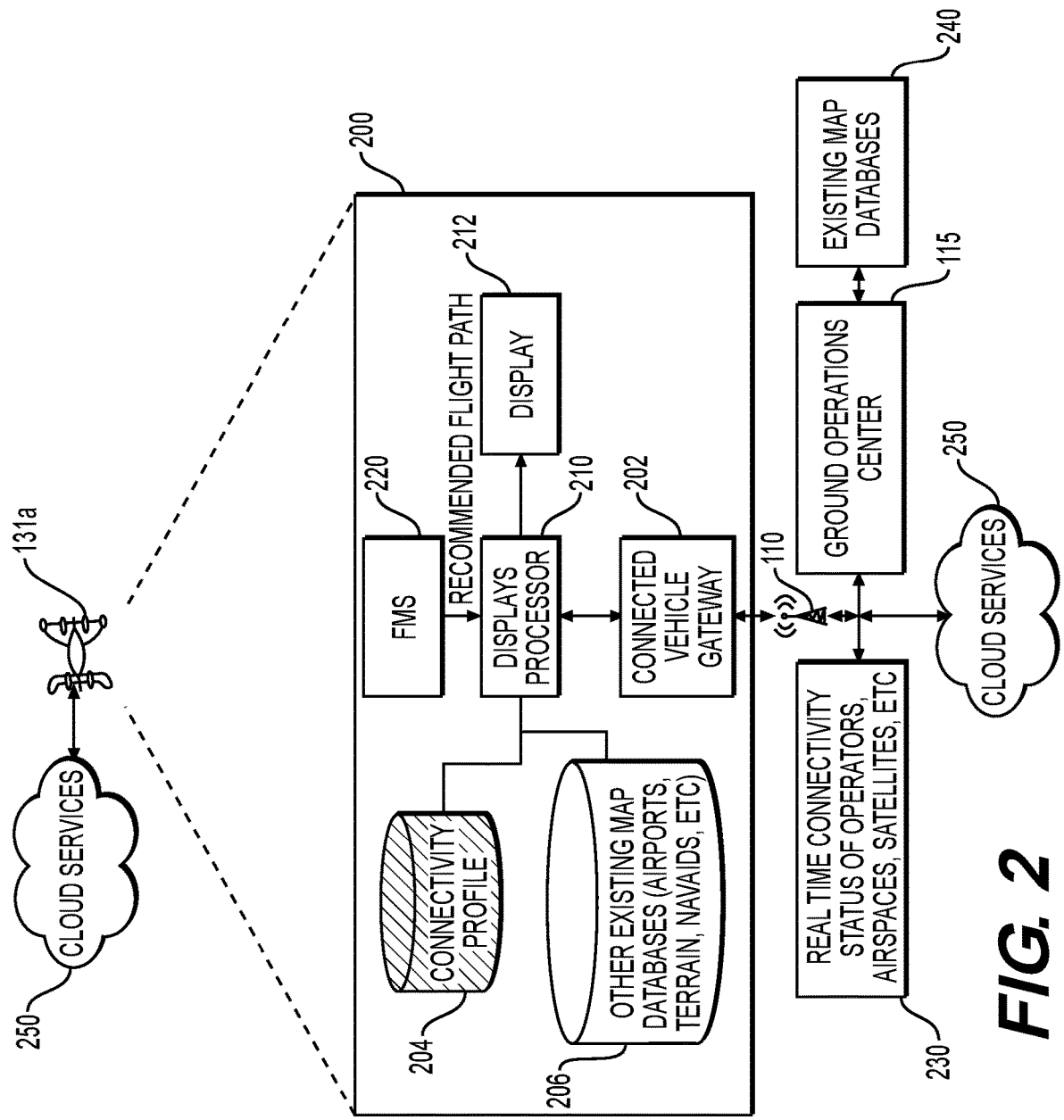
FIG. 2 depicts a block diagram of exemplary onboard and off-board systems for a connected vehicle, according to one or more embodiments.

FIG. 2 depicts a block diagram of exemplary onboard and off-board systems for a connected vehicle, according to one or more embodiments. FIG. 2 may depict exemplary onboard and off-board systems, collectively referred to as system 200, for a connected vehicle, such as connected vehicle 131a. As described in further detail herein, system 200 of connected vehicle 131a may be configured to execute one or more techniques contemplated in the present disclosure. Generally, the block diagram of system 200 may depict systems, information/data, communications between the onboard systems of a vehicle, communications between off-board systems, and communications between onboard systems of a vehicle and off-board systems.

System 200 may include the following onboard systems on connected vehicle 131a: connected vehicle gateway 202, connectivity profile 204, onboard existing map databases 206, displays processor 210, display 212, and flight management system (FMS) 220. System 200 may include the following off-board systems: communications station 110, ground operations station 115, real time connectivity status 230, existing map databases 240, and cloud services 250.

The connected vehicle gateway 202 may act as a communication channel between onboard connected vehicle 131a and other systems off-board the vehicle. For instance, connected vehicle gateway 202 may pass communications or messages and data sent from off-board to onboard connected vehicle 131a. Connected vehicle gateway 202 may pass communications or messages and data sent from onboard connected vehicle 131a to systems off-board the vehicle.

Connectivity profile 204 may contain connectivity data related to the connectivity strength at various locations in the airspace surrounding connected vehicle 131a and/or along the travel route of connected vehicle 131a. For instance, the connectivity profile 204 may contain connectivity data for areas with a strong connection as well as connectivity data for areas with low and/or no connectivity. The connectivity profile 204 may contain connectivity data for mobile/cell connections such as 4G, 5G, and SATCOM.

The onboard existing maps database 206 may contain an archive of maps for route planning. The onboard existing maps database 206 may contain topographic maps and may contain airport data and any other navigation data.

The displays processor 210 may generate a display of data that the displays processor 210 receives for display. The display 212 may display a generated display received from displays processor 210. FMS 220 may manage the route or flight plan and may guide connected vehicle 131a along the route or flight plan. FMS 220 may contain sensors such as GPS.

Still referring to FIG. 2, real time connectivity status 230 may receive real time connectivity statuses from mobile network operators or service providers, satellites, airspaces, one or more connected vehicles 131 traveling through airspaces, etc. Real time connectivity status 230 may collect and/or store the real time connectivity status data for transmission. The off-board existing maps database 240 may contain an archive of maps for route planning.

A ground operations station 115 may receive, store, and process data, such as connectivity data, that is relevant to connected vehicles 131, including connected vehicle 131a. A communications station 110 may communicate with a ground operations station 115. For instance, communications station 110 may receive data from and/or transmit data to ground operations station 115. The communications station 110 may also communicate with connected vehicle 131a. For instance, communications station 110 may receive data from and/or transmit data to connected vehicle 131a via connected vehicle gateway 202. The communication station 110 may communicate with connected vehicle 131a and/or ground operations station 115 based on mobile cell communication in accordance with, e.g. 4G/5G standards.

The cloud services 250 may communicate with communications station 110 and/or directly with connected vehicle 131a. The cloud services 250 may also communicate directly with real time connectivity status 230 and/or ground operations station 115. The cloud services 250 may receive connectivity data from connected vehicles 131, including connected vehicle 131a and may transmit the connectivity data to real time connectivity status 230 and/or ground operations station 115. The cloud services 250 may receive connectivity data from real time connectivity status 230 and/or ground operations station 115 and may transmit the connectivity data to connected vehicle 131a. The cloud services 250 may also provide software as a service (SaaS) to connected vehicles 131, including connected vehicle 131a, to perform various software functions, such as navigation services, FMS services, etc.

Figure 3:
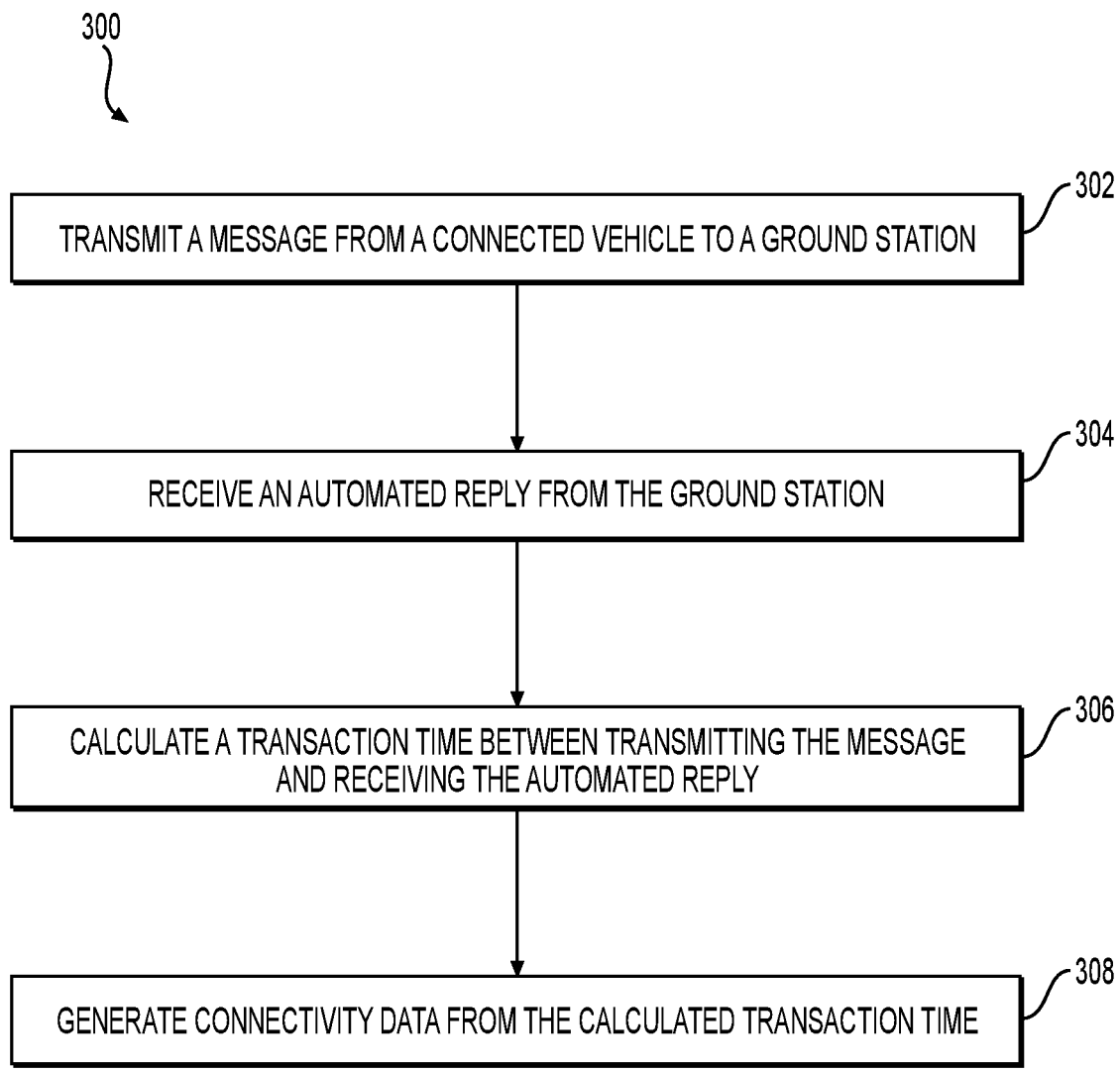
FIG. 3 depicts a flowchart illustrating an exemplary method of generating connectivity data from a connected vehicle, according to one or more embodiments.

FIG. 3 depicts a flowchart illustrating an exemplary method of generating connectivity data from a connected vehicle, according to one or more embodiments. Particularly, method 300 may depict a method of generating connectivity data from a connected vehicle. For example, method 300 may correspond to communications executed by system 200 described above with respect to FIG. 2. The method 300 may be performed by one or more connected vehicles 131, such as, for example, connected vehicle 131a of FIG. 2.

In one embodiment, connected vehicle 131a may perform the process of method 300 to generate connectivity data. At step 302, connected vehicle 131a may begin method 300 by transmitting a message from the connected vehicle (e.g., connected vehicle 131a) to ground operations station 115. The message that connected vehicle 131a transmits may pass through connected vehicle gateway 202 to communications station 110. Communications station 110 may transmit the message from connected vehicle 131a to ground operations station 115. At step 304, connected vehicle 131a may receive an automated reply from ground operations station 115. The automated reply from ground operations station 115 may be transmitted to communications station 110 and communications station 110 may transmit the automated reply to connected vehicle 131a.

At step 306, connected vehicle 131a may calculate a transaction time between transmitting the message at step 302 and receiving the automated reply from ground operations station 115 at step 304. At step 308, connected vehicle 131a may generate connectivity data based on the calculated transaction time from step 306. In some embodiments, the connectivity data generated at step 308 may be transmitted from connected vehicle 131a to ground operations station 115 to provide ground operations station 115 with connectivity data for one of connected vehicles 131, such as connected vehicle 131a.

Figure 4:
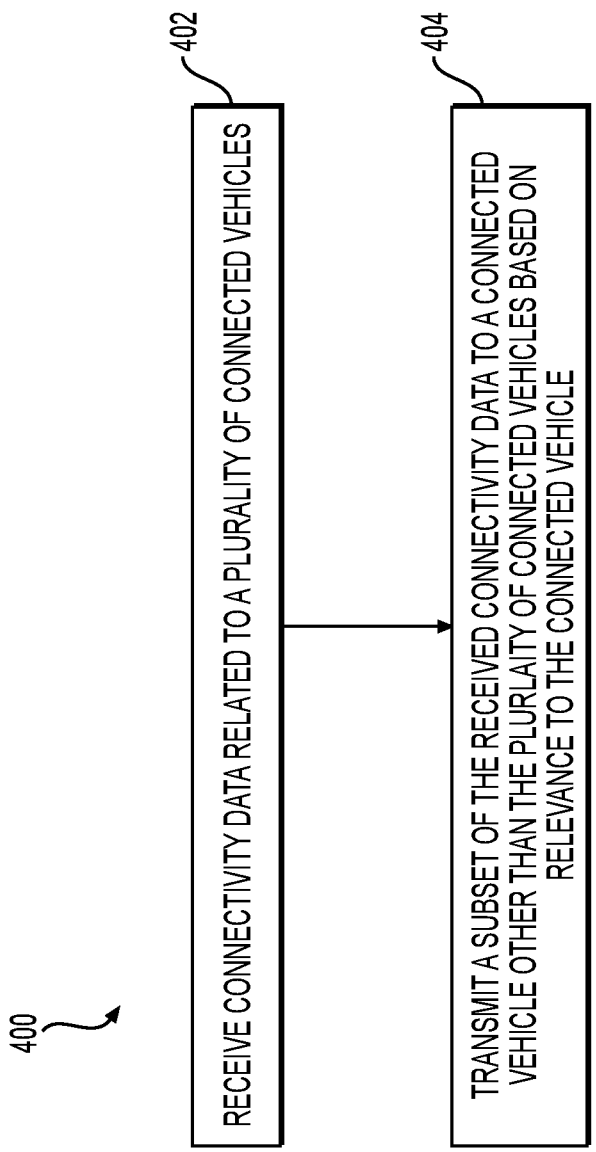
FIG. 4 depicts a flowchart illustrating an exemplary method of transmitting connectivity data to a connected vehicle, according to one or more embodiments.

FIG. 4 depicts a flowchart illustrating an exemplary method of transmitting connectivity data to a connected vehicle, according to one or more embodiments. Particularly, method 400 may depict a method of transmitting connectivity data to a connected vehicle 131, such as connected vehicle 131a. For example, method 400 may correspond to communications executed by system 200 described above with respect to FIG. 2. The method 400 may be performed by ground operations station 115 of FIG. 2.

Ground operations station 115 may start the process of method 400. At step 402, ground operations station 115 may receive connectivity data related to a plurality of connected vehicles, such as connected vehicles 131. Examples of receiving connectivity data related to a plurality of connected vehicles include receiving connectivity data directly from connected vehicles 131; analyzing GPS signal strength parameters received from satellites in communication with connected vehicles 131; analyzing mobile cell connectivity or signal strength received from a service provider providing communication to connected vehicles 131. Ground operations station 115 may receive the connectivity data related to a plurality of connected vehicles from real time connectivity status 230. Ground operations station 115 may also receive the connectivity data discussed above directly from connected vehicles 131. For instance, connected vehicles 131 may transmit connectivity data to communications station 110 and communications station 110 may transmit the connectivity data to ground operations station 115. In other embodiments, ground operations station 115 may receive the connectivity data from cloud services 250.

In some embodiments, ground operations station 115 may consolidate the received connectivity data discussed above into an overall connection strength. The overall connection strength may pertain to specific aggregated areas, sub-areas, or even specific flight plans or vehicles. The overall connection strength may form the connectivity data that may be subsequently transmitted to connected vehicle 131a (step 404).

In some embodiments, ground operations station 115 may receive connectivity data from one or more of: almanac data, building profile data, and map data relevant to a current location of connected vehicle 131a. For instance, ground operations station 115 may receive almanac data, building profile data, and map data from existing map databases 240.

At step 404, ground operations station 115 may transmit a subset of the received connectivity data to connected vehicle 131a based on the relevance to connected vehicle 131a. Ground operations station 115 may transmit a subset of the received connectivity data to communications station 110 and communications station 110 may transmit the received connectivity data to connected vehicle 131a. In other embodiments, ground operations station 115 may transmit a subset of the received connectivity data to cloud services 250 and cloud services 250 may transmit the received connectivity data to connected vehicle 131a. In some embodiments, the subset of the received connectivity data transmitted to connected vehicle 131a may be based on a current location of connected vehicle 131a. In other embodiments, the subset of the received connectivity data transmitted to connected vehicle 131a may be based on the current time.

Figure 5:
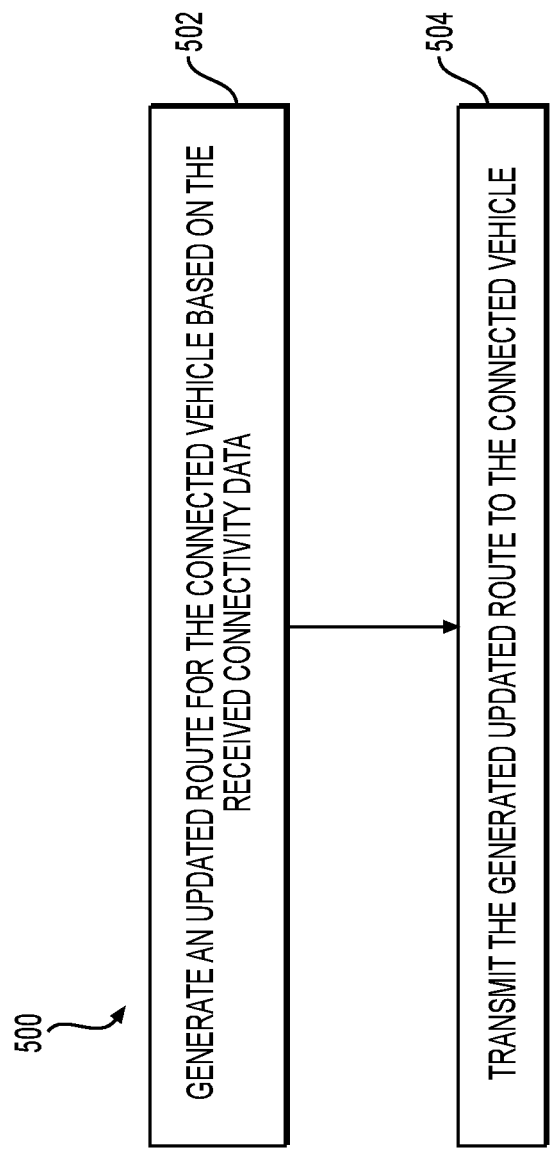
FIG. 5 depicts a flowchart illustrating an exemplary method of generating an updated route or flight plan based on the received connectivity data, according to one or more embodiments.

FIG. 5 depicts a flowchart illustrating an exemplary method of generating an updated route or flight plan based on the received connectivity data, according to one or more embodiments. Particularly, method 500 may depict a method of generating an updated route and transmitting the updated route to a connected vehicle, such as connected vehicle 131a. For example, method 500 may correspond to communications executed by system 200 described above with respect to FIG. 2. The method 500 may be performed by ground operations station 115 of FIG. 2.

Ground operations station 115 may start the process of method 500. At step 502, ground operations station 115 may receive connectivity data related to a plurality of connected vehicles, such as connected vehicles 131. Examples of receiving connectivity data related to a plurality of connected vehicles include receiving connectivity data directly from connected vehicles 131; analyzing GPS signal strength parameters received from satellites in communication with connected vehicles 131; analyzing mobile cell connectivity or signal strength received from a service provider providing communication to connected vehicles 131. Ground operations station 115 may receive the connectivity data related to a plurality of connected vehicles from real time connectivity status 230. Ground operations station 115 may also receive the connectivity data discussed above directly from connected vehicles 131. For instance, connected vehicles 131 may transmit connectivity data to communications station 110 and communications station 110 may transmit the connectivity data to ground operations station 115. In other embodiments, ground operations station 115 may receive the connectivity data from cloud services 250.

At step 502, ground operations station 115 may generate an updated route for connected vehicle 131a based on the received connectivity data discussed above. For instance, the updated route may avoid locations along the route of connected vehicle 131a with low or no connectivity and may provide a route where the connection is strong. In some embodiments, ground operations station 115 may receive data from existing map databases 240 to generate an updated route for connected vehicle 131a.

At step 504, ground operations station 115 may transmit the generated updated route from step 502 to connected vehicle 131a. Ground operations station 115 may transmit the updated route to communications station 110 and communications station 110 may transmit the updated route to connected vehicle 131a. In other embodiments, ground operations station 115 may transmit an updated route to cloud services 250 and cloud services 250 may transmit the updated route to connected vehicle 131a.

Figure 6:
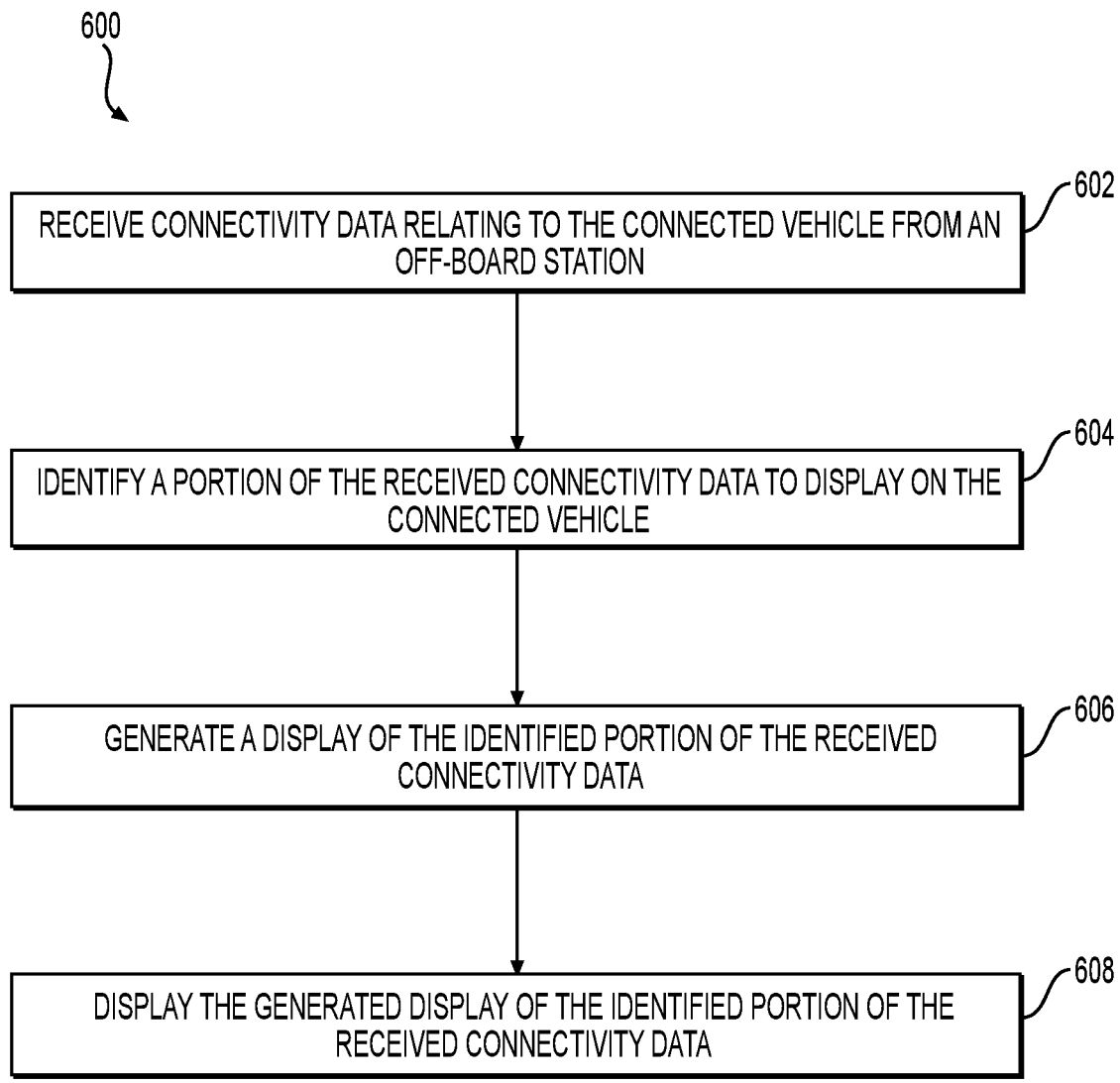
FIG. 6 depicts a flowchart illustrating an exemplary method of receiving and displaying connectivity data on a connected vehicle, according to one or more embodiments.

FIG. 6 depicts a flowchart illustrating an exemplary method of receiving and displaying connectivity data on a connected vehicle, according to one or more embodiments. Particularly, method 600 may depict a method of receiving and displaying connectivity data on a connected vehicle 131, such as connected vehicle 131a. For example, method 600 may correspond to communications executed by system 200 described above with respect to FIG. 2. The method 600 may be performed by connected vehicle 131a of FIG. 2.

At step 602, connected vehicle 131a receives connectivity data from an off-board station, such as ground operations station 115. For instance, connected vehicle 131a may receive connectivity data that has been transmitted from ground operations station 115 or real time connectivity status 230. In some embodiments, connected vehicle 131a may receive connectivity data from cloud services 250. The connectivity data received by connected vehicle 131a may be based on relevance to connected vehicle 131a. In some embodiments, the connectivity data received by connected vehicle 131a may be based on a current location of connected vehicle 131a. In other embodiments, the connectivity data received by connected vehicle 131a may be based on the current time (in addition to or alternatively to the location). For example, the relevance may be calculated based on a computed probability that a vehicle is likely to experience the same connectivity issues, such as due to its planned flight route and/or flying time. The received connectivity data may be received by and/or contained in connectivity profile 204.

At step 604, connected vehicle 131a may identify a portion of the received connectivity data to display. For instance, connectivity profile 204 onboard connected vehicle 131a may identify a portion of the received connectivity data to display. The identified portion of the received connectivity data may be transmitted from connectivity profile 204 to displays processor 210.

At step 606, connected vehicle 131a may generate a display of the identified portion of the received connectivity data from step 604. For instance, displays processor 210 may receive an identified portion of the received connectivity to display from connectivity profile 204. Displays processor 210 may generate a display of the identified portion of the received connectivity data. At step 608, connected vehicle 131a may display the generated display of the identified portion of the received connectivity data on a display unit, such as display 212. For instance, displays processor 210 may transmit the generated display as discussed above to display 212. Display 212 may display the identified portion of the received connectivity data. In some embodiments, display 212 may display locations along the route of connected vehicle 131a where the connectivity is low or non-existent.

Figure 7:
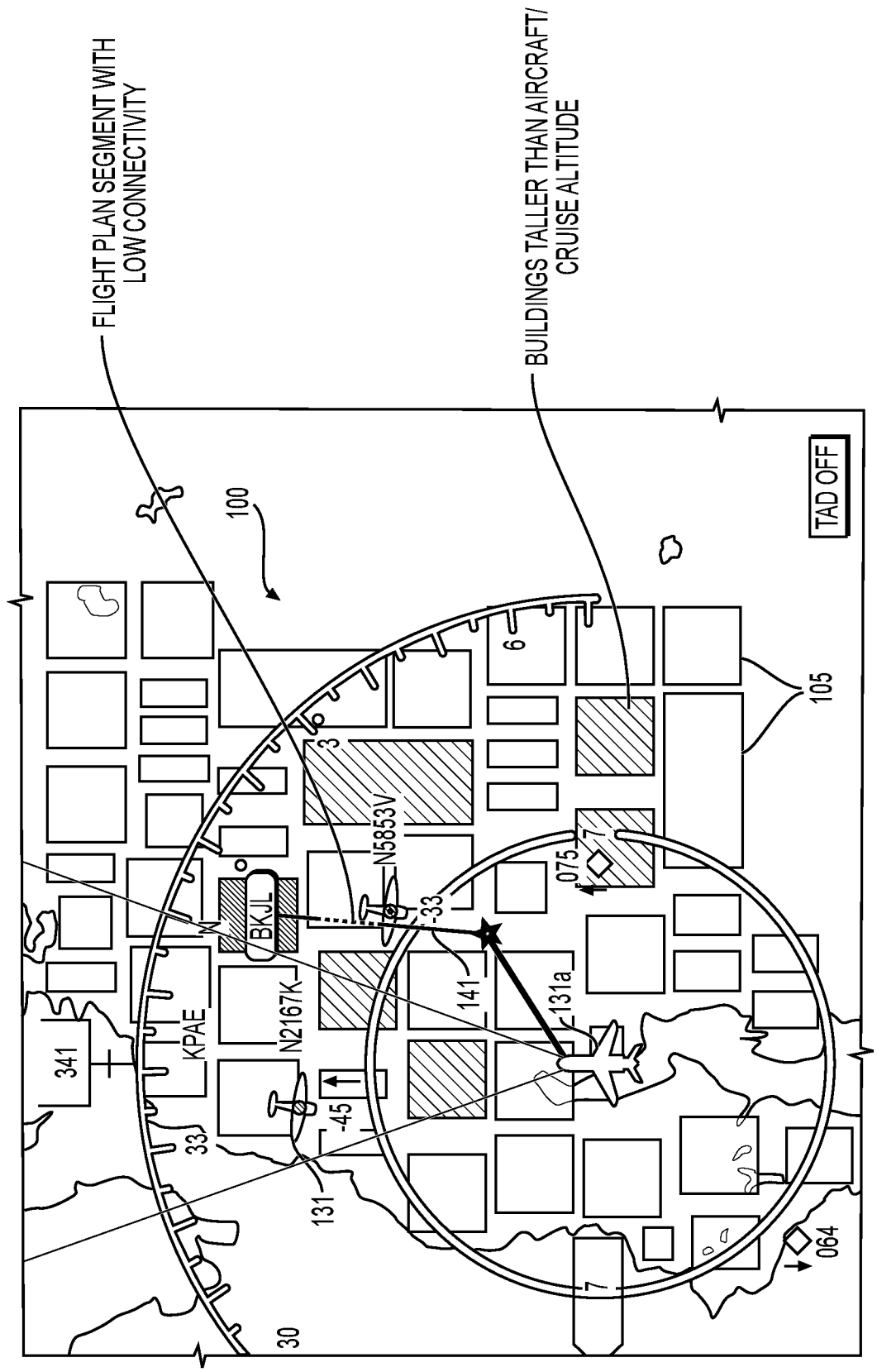
FIG. 7 depicts an exemplary lateral map display displaying a flight plan segment with low connectivity, according to one or more embodiments.

FIG. 7 depicts an exemplary lateral map displaying a flight plan segment with low connectivity, according to one or more embodiments. FIG. 7 may correspond to a display displayed by system 200 described above with respect to FIG. 2 for an airspace 100 described above with respect to FIG. 1. The exemplary lateral map display displaying a flight plan segment with low connectivity as depicted in FIG. 7, may be displayed onboard connected vehicle 131a. For instance, display 212 may display the exemplary lateral map display as shown in FIG. 7.

An exemplary lateral map display as depicted in FIG. 7 may display an overhead or bird's-eye view of an airspace, such as airspace 100 of FIG. 1, containing one or more connected vehicles 131, including connected vehicle 131a, and one or more buildings 105. The display may also depict the top of one or more buildings 105. The buildings depicted with hatched lines represent one or more buildings where the building altitude may be taller than the altitude or cruising altitude of connected vehicle 131a. The label BKJL may represent a building where connected vehicle 131a is supposed to land. The line between the star symbol for connected vehicle 131a and BKJL may represent a flight plan or route 141 for connected vehicle 131a. The stippled segment on top of flight plan or route 141 may represent a portion of the flight plan or route where connectivity is low.

For instance, FIG. 7 depicts a display as described above where the taller height and topography of certain buildings 105 along the flight path or route 141 of connected vehicle 131a impacts the connection strength.

Figure 8A:
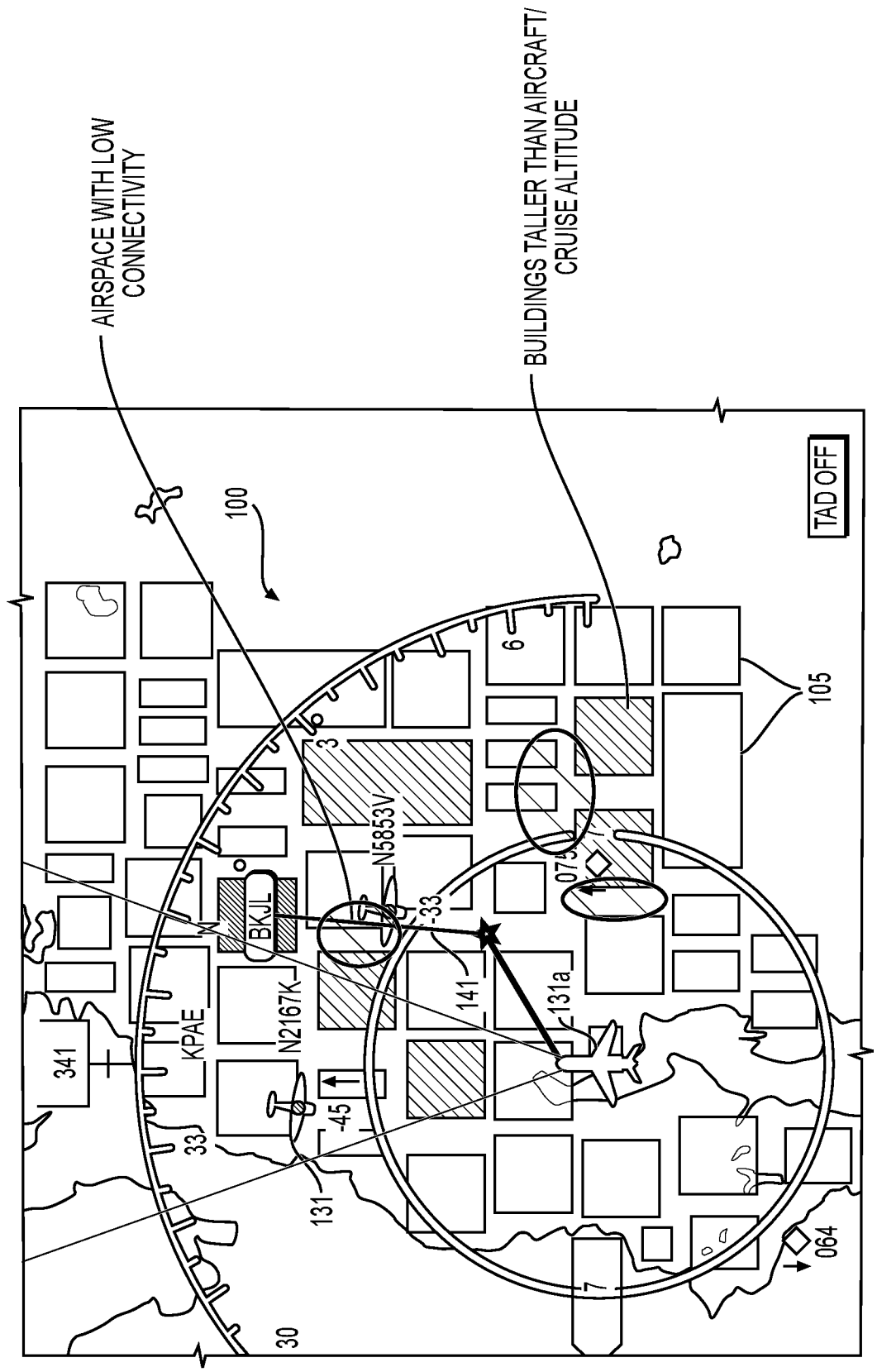
FIG. 8A depicts an exemplary lateral map display displaying airspaces with low connectivity, according to one or more embodiments.
Figure 8B:
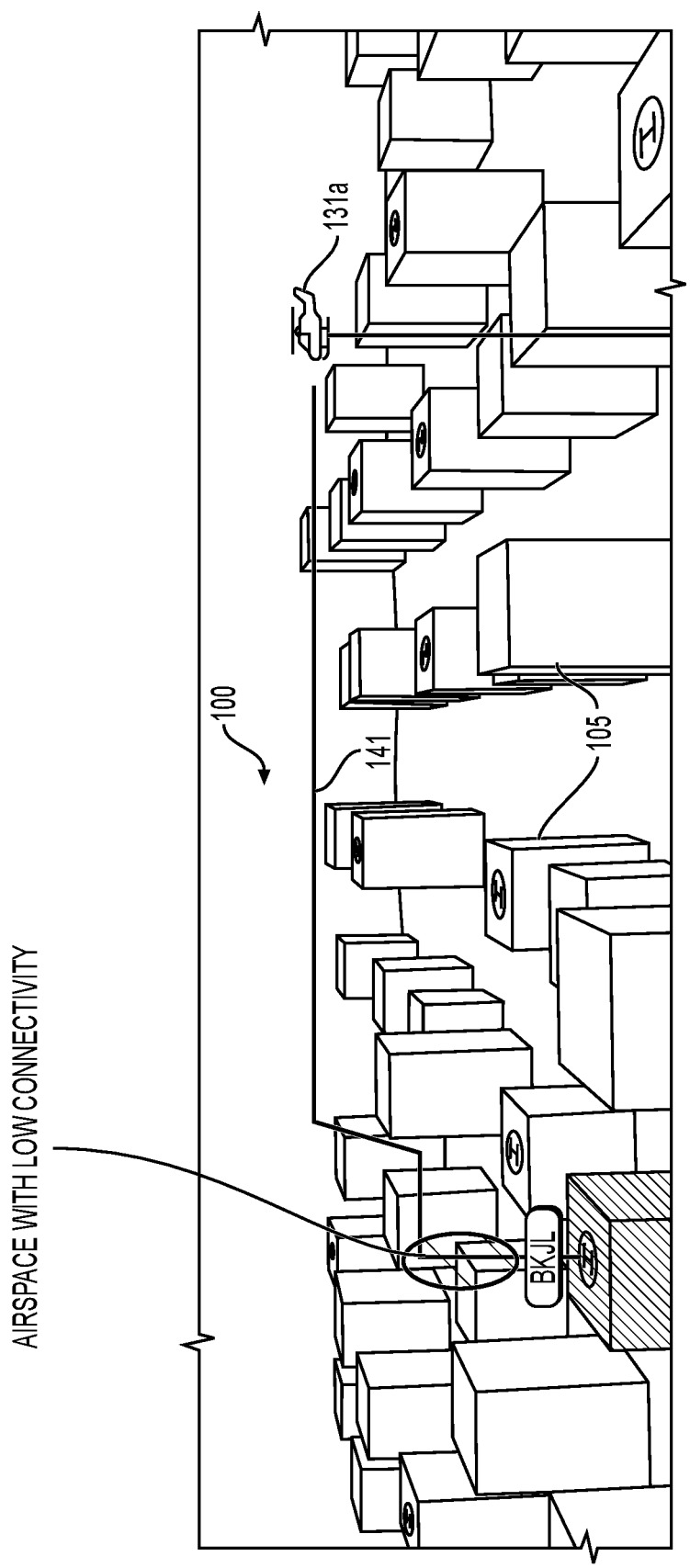
FIG. 8B depicts an exemplary vertical situation display displaying airspaces with low connectivity, according to one or more embodiments.

FIGS. 8A and 8B depict exemplary map displays displaying airspaces with low connectivity, according to one or more embodiments. FIG. 8A depicts an exemplary lateral map display. FIG. 8B depicts an exemplary vertical situation display. The exemplary map displays of FIG. 8A and FIG. 8B, may each correspond to a display displayed by system 200 described above with respect to FIG. 2 for an airspace 100 described above with respect to FIG. 1. The exemplary lateral map display displaying airspaces with low connectivity as depicted in FIG. 8A and the exemplary vertical situation display as depicted in FIG. 8B, may each be displayed onboard connected vehicles 131a. For instance, in some embodiments, display 212 may display the exemplary lateral map display as shown in FIG. 8A. In other embodiments, display 212 may display the exemplary vertical situation display as shown in FIG. 8B.

An exemplary lateral map display as depicted in FIG. 8A may display an overhead or bird's-eye view of an airspace, such as airspace 100 of FIG. 1, containing one or more connected vehicles 131, including connected vehicle 131a, and one or more buildings 105. The display may also depict the top of one or more buildings 105. The buildings depicted with hatched lines represent one or more buildings where the building altitude may be taller than the altitude or cruising altitude of connected vehicle 131a. The label BKJL may represent a building where connected vehicle 131a is supposed to land. The line between the star symbol for connected vehicle 131a and BKJL may represent a flight plan or route 141 for connected vehicle 131a. The ovals may represent areas or regions in airspace 100 where connectivity is low.

An exemplary vertical situation display as depicted in FIG. 8B may display a vertical or profile view of an airspace, such as airspace 100 of FIG. 1, containing connected vehicle 131a and one or more buildings 105. The label BKJL may represent a building where connected vehicle 131a is supposed to land. The oval may represent an area or region in airspace 100 where connectivity is low.

FIG. 9 depicts a flowchart illustrating another exemplary method of generating an updated route or flight plan based on the received connectivity data, according to one or more embodiments. Particularly, method 900 may depict a method of generating an updated route and displaying the updated route on a connected vehicle, such as connected vehicle 131a. For example, method 900 may correspond to communications executed by system 200 described above with respect to FIG. 2. The method 900 may be performed by connected vehicle 131a of FIG. 2.

At step 902, connected vehicle 131a may generate an updated route based on the received connectivity data discussed above. For instance, connected vehicle 131a may receive connectivity data that has been transmitted from ground operations station 115 or real time connectivity status 230. In some embodiments, connected vehicle 131a may receive connectivity data from cloud services 250. The received connectivity data may be received by and/or contained in connectivity profile 204. Therefore, at step 902, FMS 220 onboard connected vehicle 131a may generate an updated route based on the received connectivity data from the connectivity profile 204. In instances where the received connectivity data indicates areas or regions along the route or flight plan of connected vehicle 131a where the connectivity is low or non-existent, FMS 220 may generate an updated route that avoids the regions with low connectivity. Thus, the updated route will circumvent areas with low connectivity and guide connected vehicle 131a through areas with consistent and stable connectivity strength.

At step 904, connected vehicle 131a may display the generated updated route from FMS 220 on a display unit, such as display 212. For instance, FMS 220 may transmit the updated route as discussed above to display 212. Display 212 may display the updated route.

In other embodiments, connected vehicle 131a may receive an updated route from an off-board FMS. For instance, when an FMS is located off-board connected vehicle 131a, such as an FMS that is a part of ground station 115, the off-board FMS may generate an updated route based on connectivity data received from real time connectivity status 230. In other embodiments, an off-board FMS may generate an updated route based on connectivity data received from cloud services 250. Connected vehicle 131a may receive the updated route from an off-board FMS and display the updated route on display 212.

Figure 10:
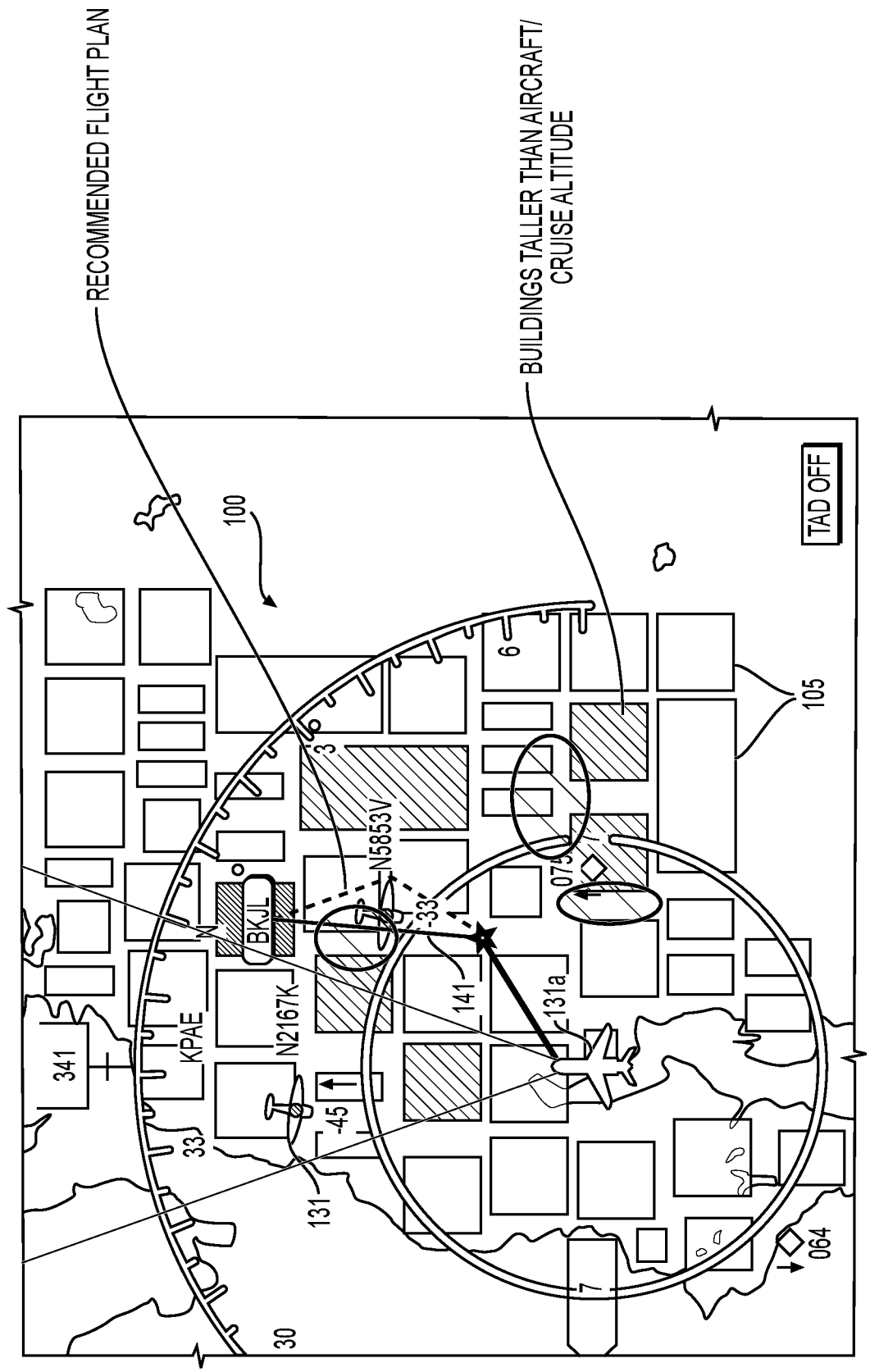
FIG. 10 depicts an exemplary lateral map display displaying an updated route or flight plan, according to one or more embodiments.

FIG. 10 depicts an exemplary lateral map display displaying an updated route or flight plan, according to one or more embodiments. FIG. 10 may correspond to a display displayed by system 200 described above with respect to FIG. 2 for an airspace 100 described above with respect to FIG. 1. The exemplary lateral map display displaying an updated route may be displayed onboard connected vehicle 131a.

An exemplary lateral map display as depicted in FIG. 10 may display an overhead or bird's-eye view of an airspace, such as airspace 100 of FIG. 1, containing one or more connected vehicles 131, including connected vehicle 131a, and one or more buildings 105. The display may also depict the top of one or more buildings 105. The buildings depicted with hatched lines represent one or more buildings where the building altitude may be taller than the altitude or cruising altitude of connected vehicle 131a. The label BKJL may represent a building where connected vehicle 131a is supposed to land. The straight line between the star symbol for connected vehicle 131a and BKJL may represent a flight plan or route 141 for connected vehicle 131a. The ovals may represent areas or regions in airspace 100 where connectivity is low. The angled stippled line from the star symbol for connected vehicle 131a to BKJL may represent an updated route or flight plan.

For instance, FIG. 10 depicts that the original route or flight plan may take connected vehicle 131a directly through a region with low connectivity in order to land at BKJL. The display of the recommended flight plan for connected vehicle 131a in FIG. 10 may direct connected vehicle 131a along a route that avoids the low connectivity region, allowing for a safe landing with a stronger connection and stronger GPS coverage.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

After reading this description, it will become apparent to a person skilled in the relevant art how to implement embodiments of the present disclosure using these or other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that in the above description of exemplary embodiments of the present description, various features of the present description are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present description.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the present disclosure, and it is intended to claim all such changes and modifications as falling within the scope of the present disclosure. For example, functionality may be added or deleted from the block diagrams and operations may be interchanged among functional blocks. Steps may be added to, deleted from, or repeated, in methods described herein, while remaining within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. It is intended that the specification and examples be considered as exemplary only, with a true scope and spirit of the disclosure being indicated by the following claims.

What is claimed is:

1. A method of receiving and displaying connectivity data by a first network-connected vehicle, the method comprising:
   receiving, from an off-board system, a subset of connectivity data relating to the first network-connected vehicle, wherein:
     the connectivity data was received by the off-board system from one or more other vehicles communicatively connected to the off-board system and comprises communication connectivity strength at a first location within an airspace,
     the received subset of the connectivity data includes the communication connectivity strength at the first location within the airspace,
     the first location comprises an area or a region along a route or flight plan of the first network-connected vehicle, and
     the off-board system comprises a communications station or a ground operations station;
   identifying a portion of the received subset of the connectivity data that includes a low or non-existent connectivity location along the route or flight plan of the first network-connected vehicle;
   receiving, from the off-board system, an updated route for the first network-connected vehicle based on the received subset of the connectivity data that circumvents the low or non-existent connectivity location;
   generating a display of (i) the airspace, (ii) the route or flight plan of the first network-connected vehicle, and (iii) the updated route for the first network-connected vehicle; and
   displaying, on a display unit of the first network-connected vehicle, the generated display that includes (i) the airspace, (ii) the route or flight plan of the first network-connected vehicle, and (iii) the updated route for the first network-connected vehicle.

2. The method of claim 1, further comprising:
   generating an updated route for the first network-connected vehicle based on the received connectivity data; and
   displaying, on the display unit of the first network-connected vehicle, the generated updated route.

3. The method of claim 1, further comprising:
   receiving, from the off-board system, an updated route for the first network-connected vehicle based on the received connectivity data; and
   displaying, on the display unit of the first network-connected vehicle, the received updated route.

4. The method of claim 1, wherein displaying the generated display of the identified portion of the received connectivity data comprises displaying locations wherein connectivity strength is low or wherein connectivity is non-existent.

5. The method of claim 1, wherein the display unit of the first network-connected vehicle is selected from at least one of a lateral map display and a vertical situation display.

6. The method of claim 1, wherein the connectivity data comprises one or more of:
   connectivity data received from the one or more other vehicles;
   GPS signal strength parameters received from satellites in communication with the one or more other vehicles; and
   mobile cell connectivity or signal strength received from a service provider providing communication to the one or more other vehicles.

7. The method of claim 1, wherein the connectivity data further comprises one or more of:
   almanac data, building profile data, and map data relevant to a current location of the first network-connected vehicle.

8. The method of claim 1, wherein the first network-connected vehicle and the one or more other vehicles are connected to a mobile network, and wherein the subset of connectivity data that is received by the first network-connected vehicle comprises connectivity data for the mobile network.

9. The method of claim 1, wherein the connectivity data that was received by the off-board system from the one or more other vehicles is generated by:
   transmitting, by the one or more other vehicles, a message to a ground station of the off-board system;

receiving, by the one or more other vehicles, an automated reply from the ground station and after the transmitted message is received by the ground station;

calculating, by the one or more other vehicles, a transaction time between transmitting the message and receiving the automated reply; and generating the connectivity data from the calculated transaction time, the connectivity data being defined at least in part by the communication connectivity strength at the first location within the airspace.

10. The method of claim 1, wherein the off-board system determines the subset of the connectivity data relating to the first network-connected vehicle based on the location of the connected vehicle, the current time, and a computed probability that the first network-connected vehicle will experience connectivity issues along the route or flight plan of the first network-connected vehicle.

11. The method of claim 1, wherein the route or flight plan of the first network-connected vehicle is displayed simultaneously with the updated route for the first network-connected vehicle on the display unit of the first network-connected vehicle.

12. The method of claim 11, wherein the route or flight plan of the first network-connected vehicle and the updated route for the first network-connected vehicle is displayed on the display unit of the first network-connected vehicle as lines that are visually distinct from each other.

13. The method of claim 12, wherein the route or flight plan of the first network-connected vehicle is displayed as a solid line and the updated route for the first network-connected vehicle is displayed as a stippled line.

14. The method of claim 1, further comprising generating a display of (iv) structures positioned adjacent to or under the airspace, wherein the generated display includes (i) the airspace, (ii) the route or flight plan of the first network-connected vehicle, (iii) the updated route for the first network-connected vehicle, and (iv) the structures, wherein the structures comprise buildings.

15. The method of claim 14, wherein the generated display of the structures comprises a first building that has a building altitude that is taller than the altitude of the first network-connected vehicle and a second building that has a building altitude that is shorter than the altitude of the first network-connected vehicle, wherein the first building is depicted visually distinct from the second building.

16. The method of claim 15, wherein the first building is depicted with hatched lines.

17. The method of claim 1, wherein displaying (ii) the route or flight plan of the first network-connected vehicle comprises displaying the low or non-existent connectivity location along the route or flight plan of the first network-connected vehicle visually distinctively from at least one other location along the route or flight plan of the first network-connected vehicle.

18. The method of claim 17, wherein the low or non-existent connectivity location along the route or flight plan is depicted with an oval on top of the route or flight plan.

19. The method of claim 17, wherein the low or non-existent connectivity location along the route or flight plan is depicted as a stippled segment on top of the route or flight plan.

20. The method of claim 1, wherein the airspace is displayed as a profile view.

* * * * *